United States Patent
Coleman

(10) Patent No.: US 8,451,626 B2
(45) Date of Patent: May 28, 2013

(54) GATE DRIVER POWER AND CONTROL SIGNAL TRANSMISSION CIRCUITS AND METHODS

(75) Inventor: Charles Coleman, Fort Collins, CO (US)

(73) Assignee: Microsemi Corporation, Aliso Viejo, CA (US)

(*) Notice: Subject to any disclaimer, the term of this patent is extended or adjusted under 35 U.S.C. 154(b) by 168 days.

(21) Appl. No.: 13/197,612

(22) Filed: Aug. 3, 2011

(65) Prior Publication Data

US 2012/0032708 A1   Feb. 9, 2012

Related U.S. Application Data

(60) Provisional application No. 61/370,444, filed on Aug. 3, 2010.

(51) Int. Cl.
H02M 3/335 (2006.01)
H02M 7/44 (2006.01)

(52) U.S. Cl.
USPC .... 363/17; 363/21.04; 363/21.06; 363/21.08; 363/21.09; 363/21.1; 363/24; 363/25; 363/95; 363/98

(58) Field of Classification Search
USPC ............... 363/17, 21.04, 21.06, 21.08, 21.09, 363/21.1, 24, 25, 95, 98
See application file for complete search history.

(56) References Cited

U.S. PATENT DOCUMENTS

| 5,563,776 | A | * | 10/1996 | Eck | 363/26 |
| 5,576,940 | A | * | 11/1996 | Steigerwald et al. | 363/17 |
| 5,907,223 | A | * | 5/1999 | Gu et al. | 315/247 |
| 6,418,038 | B2 | * | 7/2002 | Takahama et al. | 363/17 |
| 8,125,158 | B2 | * | 2/2012 | Nishino et al. | 315/247 |
| 2002/0012257 | A1 | * | 1/2002 | Takahama et al. | 363/95 |
| 2006/0139978 | A1 | * | 6/2006 | Hsieh et al. | 363/71 |
| 2010/0109571 | A1 | * | 5/2010 | Nishino et al. | 315/307 |
| 2012/0188801 | A1 | * | 7/2012 | Lee et al. | 363/21.13 |

* cited by examiner

Primary Examiner — Bao Q Vu
(74) Attorney, Agent, or Firm — Holland & Hart LLP

(57) ABSTRACT

Methods, systems, and devices are described for both power and control signal transmission through a single coupled inductor. A current driver generates a cyclical current signal on a primary winding of a coupled inductor, to induce a voltage signal at the secondary winding corresponding to the cyclical current signal. A rectifier module is coupled with the secondary winding and configured to rectify the signal induced at the secondary winding. A control timing signal module is coupled with the primary winding and configured to induce voltage pulses on the secondary winding, the induced voltage pulses having an insubstantial impact on the output of the rectifier module. A switching module coupled with the secondary winding is configured to receive the voltage pulses and control a switching signal for a power switch coupled with the output of the rectifier and provide power to a load coupled with the output of the rectifier.

20 Claims, 8 Drawing Sheets

GATE DRIVER POWER AND CONTROL SIGNAL TRANSMISSION CIRCUITS AND METHODS

CROSS REFERENCES

This application claims priority to U.S. provisional patent application Ser. No. 61/370,444 entitled "AUTO-OPTIMIZATION CIRCUITS AND METHODS FOR CYCLICAL ELECTRONIC SYSTEMS," filed on Aug. 3, 2010, the entire disclosure of which is incorporated herein by reference for all purposes. This application is also related to: U.S. patent application Ser. No. 13/197,596, filed on even date herewith, entitled "AUTO-ADJUSTMENT CIRCUITS AND METHODS FOR CYCLICAL ELECTRONIC SYSTEMS,", and U.S. patent application Ser. No. 13/197,621, filed on even date herewith, entitled "SINGLE INDUCTOR POWER CONVERTER SYSTEM AND METHODS," and the entire disclosure of each is incorporated herein by reference for all purposes.

BACKGROUND

The present disclosure is directed to circuits and methods for transmission of power and control signals through a single circuit isolation element, such as a coupled inductor.

In many electrical circuits, electrical isolation of one portion of a circuit from another portion of the circuit may be desired. Electrical isolation may be desired for any of a number of reasons, such as protection against electric shock, suppression of electrical noise in sensitive devices, and to transfer power between two circuits which must not be connected together, to name a few. Various different isolation devices are commonly used, such as optically isolated amplifiers and isolation transformers, for example.

An isolation transformer is a transformer used to transfer electrical power from a source of alternating current (AC) power to some equipment or device while isolating the powered device from the power source, commonly for safety reasons. Isolation transformers provide galvanic isolation and may be used to protect against electric shock, to suppress electrical noise in sensitive devices, or to transfer power between two circuits which must not be connected together. Furthermore, suitably designed isolation transformers block interference caused by ground loops, and isolation transformers with electrostatic shields may be used for power supplies for sensitive equipment such as computers or laboratory instruments.

One common use of an electrically isolated circuit is in isolated gate drivers for power switches, such as power MOSFETs. Such isolated gate drivers may be constructed using a gate drive transformer that drives the gate directly. Traditional isolated gate drivers use a transformer to provide drive power, and a different mechanism to provide the control signal for controlling the switching of the gate.

SUMMARY

Methods, systems, and devices are described for both power and control signal transmission through a single coupled inductor. The coupled inductor includes one or more taps on a primary side of the winding. The tap(s) may be shorted to thereby change the number of turns in the primary winding, and change the voltage in the secondary winding. A series of pulses may be generated in the voltage at the secondary winding that have little or no impact on the power transferred to the second winding and that may be used to control the switching element coupled with the secondary winding. Thus, the switching device control signals, and the power for the switching device, and transferred through the single magnetic element.

In one embodiment, a gate driver apparatus is provided. The gate driver apparatus comprises a current driver module configured to generate a cyclical current signal. A coupled inductor having a primary winding and a secondary winding is coupled with the current driver module and configured to induce a voltage at the secondary winding corresponding to the cyclical current signal. A rectifier module is coupled with the secondary winding and configured to rectify the signal induced at the secondary winding. A control timing signal module is coupled with the primary winding and configured to induce voltage pulses on the secondary winding, the induced voltage pulses having an insubstantial impact on the output of the rectifier module. A switching module coupled with the secondary winding is configured to receive the voltage pulses and control a power switch coupled with the output of the rectifier responsive to the voltage pulses.

In another embodiment, a method for controlling and providing power to an output load. The method comprises providing a cyclical current signal to a primary winding of a coupled inductor, and inducing a voltage at a secondary winding of the coupled inductor corresponding to the cyclical current signal. The induced signal is rectified to produce a rectified output signal. Voltage pulses are induced on the secondary winding, which have an insignificant impact on the rectified output signal. A power switch coupled with the rectifier output is switched based on the voltage pulses to provide power to a load coupled with the output of the rectifier based on the voltage pulses.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Systems, devices, and methods are described for both power and control signal transmission through a single coupled inductor. The coupled inductor includes one or more taps on a primary side of the winding. The tap(s) may be shorted to thereby change the number of turns in the primary winding, and change the voltage in the secondary winding. A series of pulses may be generated in the voltage at the secondary winding that have little or no impact on the power transferred to the second winding and that may be used to control the switching element coupled with the secondary winding. Thus, the switching device control signals, as well as the power for the switching device, are transferred through the single magnetic element.

The term "switch" or "switch element," as used herein, refers to an electrical circuit element that may have two electrical states, one of which substantially blocks current flow through the element and the other of which allows current flow through the element substantially unimpeded. Such switches may include, for example, rectifier diodes, transistors, relays, and thyristors.

Figure 1:
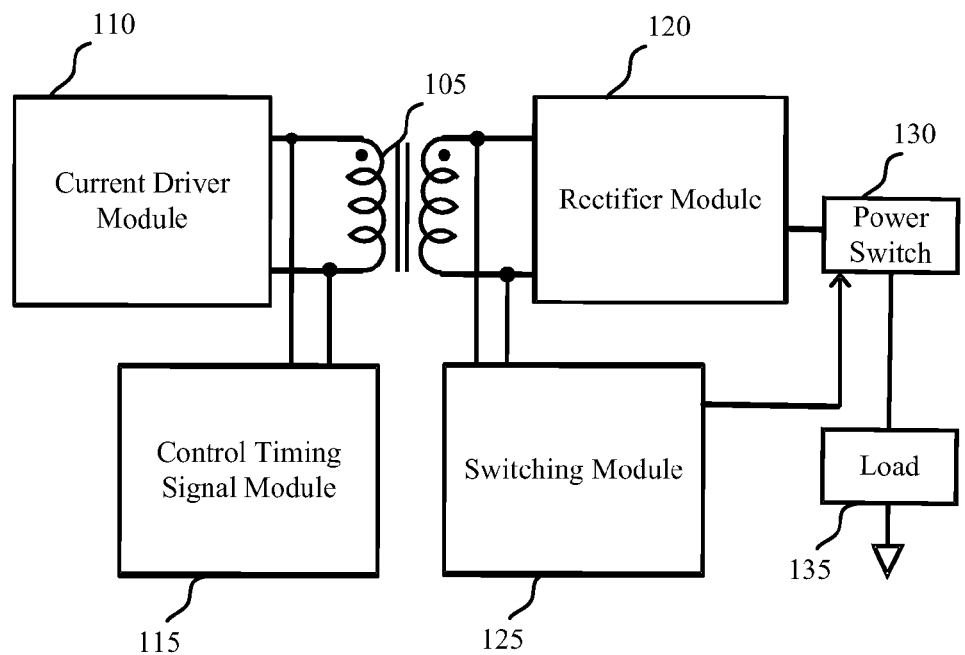
FIG. 1 illustrates a system block diagram for power and control signal transmission through an electrical isolation element.

With reference to FIG. 1, a block diagram of a system 100 of an embodiment is described. In this embodiment, system 100 provides for both power and control signal transmission through a single coupled inductor 105. A current driver module 110 generates a current that is provided to a primary winding of inductor 105. The current provided by the current driver module is a cyclical current signal having a magnitude and frequency that is determined based on the needs of the particular application. In one embodiment, the current driver module 110 provides complementary square wave signals with slightly less than 50% duty cycle for driving the primary winding of inductor 105. The current driver module 110 provides power, through the inductor 105, that is to be used by components coupled with a secondary winding of the inductor 105. The components coupled with the secondary winding will be described in more detail below. The current driver module 110 is thus configured to induce a voltage at the secondary winding corresponding to the cyclical current signal, the induced voltage may then be used to power various components or modules coupled with the secondary winding of the inductor 105.

A control timing signal module 115 is coupled to the primary winding of inductor 105, and is configured to provide a signal to the primary winding of inductor 105 that results in voltage pulses generated in the voltage at the secondary winding. The generated voltage pulses may be relatively brief and have little or no impact on the power transferred to the secondary winding of inductor 105 from the current driver module 110. A rectifier module 120 is coupled with the secondary winding of inductor 105 and is configured to rectify the cyclical voltage that is induced at the secondary winding of inductor 105. The rectified signal may be used for any number of purposes, such as providing power to a power switch 130 and load 135 that are coupled with the output of the rectifier module 120.

Switching module 125 is also coupled with the secondary winding. The switching module may be configured to receive the voltage pulses induced at the secondary winding by the control signal timing module 115. The switching module 125 may receive the voltage pulses and control a switching signal for power switch 130 coupled with the output of the rectifier module 120, and provide power to load 135. Power switch 130 receives the rectified voltage from the rectifier module 120, and a control signal from switching module 125 that controls the turning on and turning off of the power switch 130 to provide power output to the load 135. As will be described in more detail below, the control timing signal module 115 may be configured to induce voltage pulses on the secondary winding of the inductor 105 comprising a first voltage pulse having a first magnitude, and a second voltage pulse having a second magnitude, and the switching module 125 is configured to receive the first voltage pulse and switch on the power switch 130, and receive the second voltage pulse and switch off the power switch 130. The voltage pulses that are induced on secondary winding of the inductor 105 have a relatively short duration with respect to the period of the 50% duty cycle square wave so that the effect of the inducted voltage pulses on the rectifier output is negligible, and has an insubstantial effect on the voltage output of the rectifier The components of the system 100 may, individually or collectively, include a number of discrete analog circuit elements. The components of the system 100 may also, individually or collectively, be implemented in whole or in part with one or more application specific integrated circuits (ASICs) adapted to perform some or all of the applicable functions in hardware. Alternatively, the functions may be performed by one or more other processing units (or cores), on one or more integrated circuits.

Figure 2:
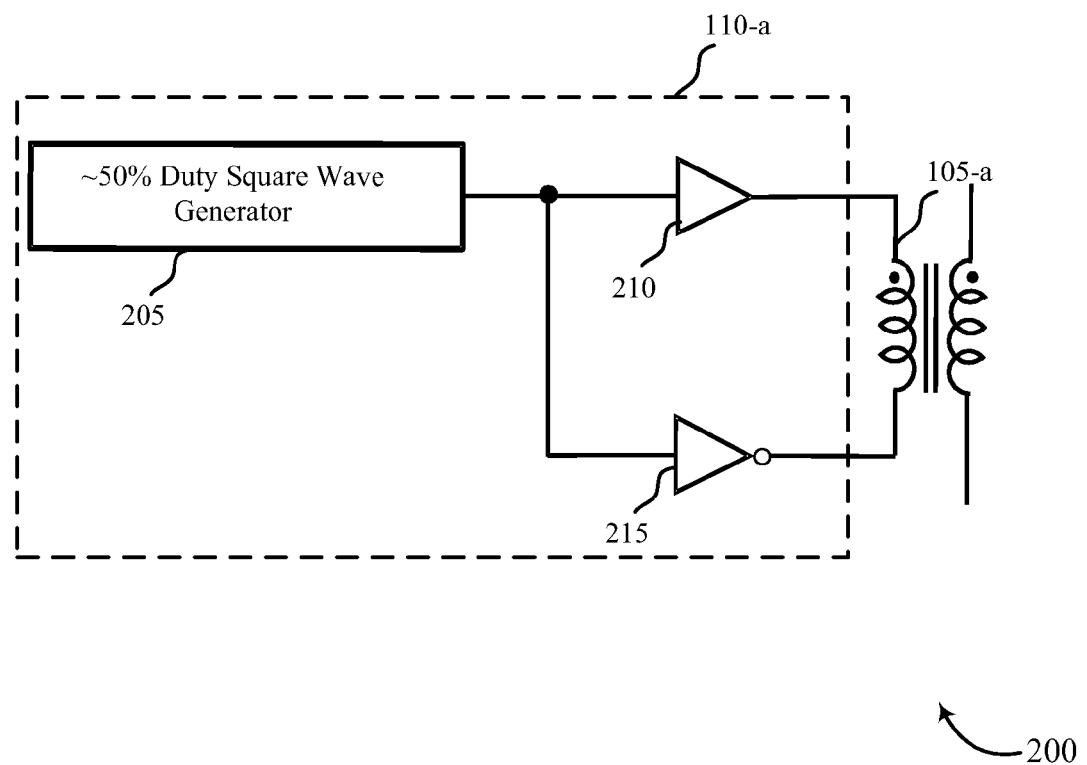
FIG. 2 illustrates a circuit diagram of a current driver module for power and control signal transmission through an electrical isolation element.

With reference now to FIG. 2, a circuit 200 is described in which an exemplary current driver module 110-a provides a signal to a coupled inductor 105-a. The current driver module 110-a may be used as the current driver module 110 in FIG. 1, for example, that induces voltage on the secondary winding of inductor 105-a. The voltage induced at the secondary winding may in turn be used to provide power to components coupled with the secondary winding of inductor, such as the rectifier module 120, power switch 130, and load 135 of FIG. 1. The current driver module 110-a of FIG. 2 includes an approximately 50% duty square wave generator 205. The output of the square wave generator 205 is provided to the inputs of a driver 210, and an inverting driver 215. Thus, when the output of one driver is high, the other is low. Accordingly, as the square wave generator 205 outputs alternating high and low voltage level signals, the outputs of driver 210 and inverting driver 215 alternate between high and low level outputs.

Driver 210 is coupled with the dotted terminal of the primary winding of inductor 105, and inverting driver is coupled with the undotted terminal of the primary winding of inductor 105. As the outputs of driver 210 and inverting driver 215 alternate in a complementary fashion between high and low outputs, the current driver module 110-a provides complementary square wave signals with slightly less than 50% duty cycle for driving the primary winding of inductor 105-a. The complementary square wave signals induce corresponding complementary square wave signals in the secondary winding of inductor 105-a that may be used to, for example, provide power to components coupled with the secondary winding of the inductor 105-a.

Figure 3:
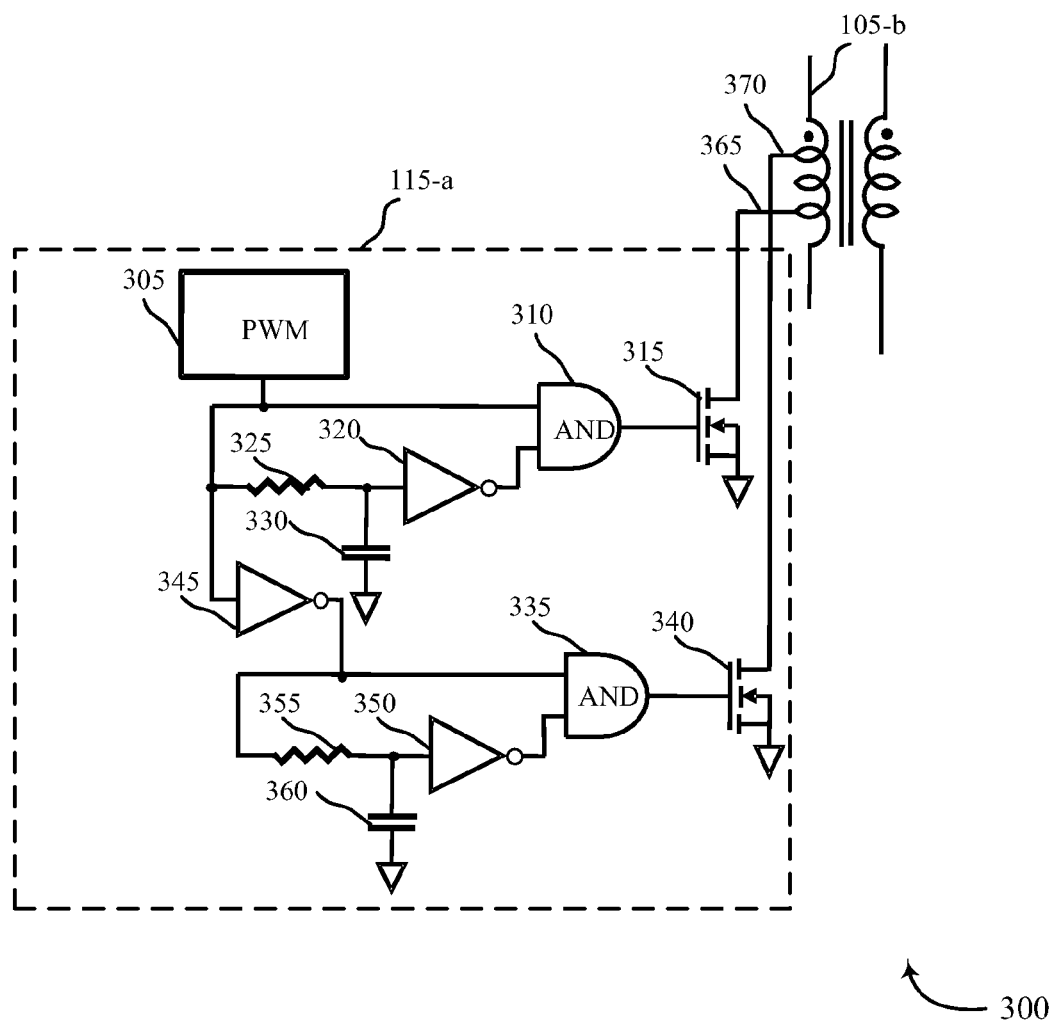
FIG. 3 illustrates a circuit diagram of a control timing signal module for power and control signal transmission through an electrical isolation element.

As discussed above, the control system timing module 115 may generate a signal at the primary winding of inductor 105 that results in voltage pulses generated in the voltage signal induced at the secondary winding. With reference now to FIG. 3, a circuit 300 is described that includes a control system timing module 115-a coupled with the primary winding of coupled inductor 105-b. The control system timing module 115-a may correspond to the control system timing module 115 of FIG. 1. In this embodiment, the coupled inductor 105-b includes two taps that may be shorted to effectively reduce the number of turns on the primary winding of inductor 105-b. Control system timing module 115-a includes a pulse width modulator (PWM) 305. As is understood, PWM is a technique for controlling power to inertial electrical devices. The PWM generator 115-a provides a rectangular pulse wave whose pulse width is modulated based on a desired control for the output of the power switch located on the secondary side of inductor 105-b. The output of PWM 305 is provided to an input of an AND gate 310 with the output of the AND gate 305 provided to first switch 315. The second input to the AND gate 310 is an inverted and delayed version of the PWM 305 output, that is inverted at inverter 320 and delayed through resistor 325 and capacitor 330 configured to provide a delay according to the RC time constant for resistor 325 and capacitor 330. A second AND gate 335 and second switch 340 are coupled with an inverted output of PWM 305 through inverter 345. The first input of AND gate 335 is connected to the inverted PWM output and the second input to the AND gate 335 is an inverted and delayed version of the inverted PWM 305 output, that is inverted at inverter 350 and delayed through resistor 355 and capacitor 360 configured to provide a delay according to the RC time constant for resistor 355 and capacitor 360.

As mentioned above, the primary winding of inductor 105-b includes two taps, namely first tap 365 and second tap 370. Each tap 365, 370 is configured to reduce the number of turns in the primary winding and thereby increase the volts per turn for the remaining turns of the primary winding. This increase in volts per turn acts to increase the secondary winding voltage. The control timing signal module 115-a is coupled with the first tap 365 and second tap 370 and configured to short the first tap 365 to ground when switch 315 is turned on. As mentioned above, switch 315 is turned on when the output of AND gate 310 goes high. Output of AND gate 310 goes high based on when the PWM 305 output goes high. That is, when PWM 305 output is low, the first input to AND gate 310 is low and the second input to AND gate 310 is high. When the PWM output goes high, the first input to AND gate 310 goes high and the second input to AND gate 310 is also high, due to the RC time delay, generating a high output from AND gate 310 that turns on switch 315. Switch 315, when turned on, shorts the first tap 365 to ground, thereby inducing a higher voltage on the secondary winding of inductor 105-b. After the RC time constant delay resultant from resistor 325 and capacitor 330, the second input to the AND gate 310 goes low, the output of the AND gate 310 goes low, and switch 315 turns off, restoring the original number of turns to the primary winding of inductor 105-b. Thus the voltage pulse induced on the secondary winding of inductor 105-b has a duration that is determined based on the RC time constant of resistor 325 and capacitor 330 and a magnitude that is determined by the placement of the first tap 365 and the number of windings that are shorted when the first tap 365 is shorted to ground. In one embodiment, the magnitude of the voltage generated through shorting the first tap 365 corresponds to a signal to turn on a power switch (such as power switch 130 of FIG. 1) coupled with the secondary winding.

Similarly, when the output of PWM 305 goes from high to low, the first input to AND gate 335 goes high and the second input to AND gate 335 is also high, generating a high output from AND gate 335 that turns switch 340 on and shorts the second tap 370 to ground, inducing a higher voltage on the secondary winding of inductor 105-b. After the RC time constant delay resultant from resistor 355 and capacitor 360, the second input to the AND gate 335 goes low, the output of the AND gate 335 goes low, and switch 340 turns off, restoring the original number of turns to the primary winding of inductor 105-b. Thus the voltage pulse induced on the secondary winding of inductor 105-b has a duration that is determined based on the RC time constant of resistor 355 and capacitor 360 and a magnitude that is determined by the placement of the second tap 370. In one embodiment, the magnitude of the voltage generated through shorting the second tap 370 corresponds to a signal to turn off a power switch (not shown) coupled with the secondary winding.

Figure 4:
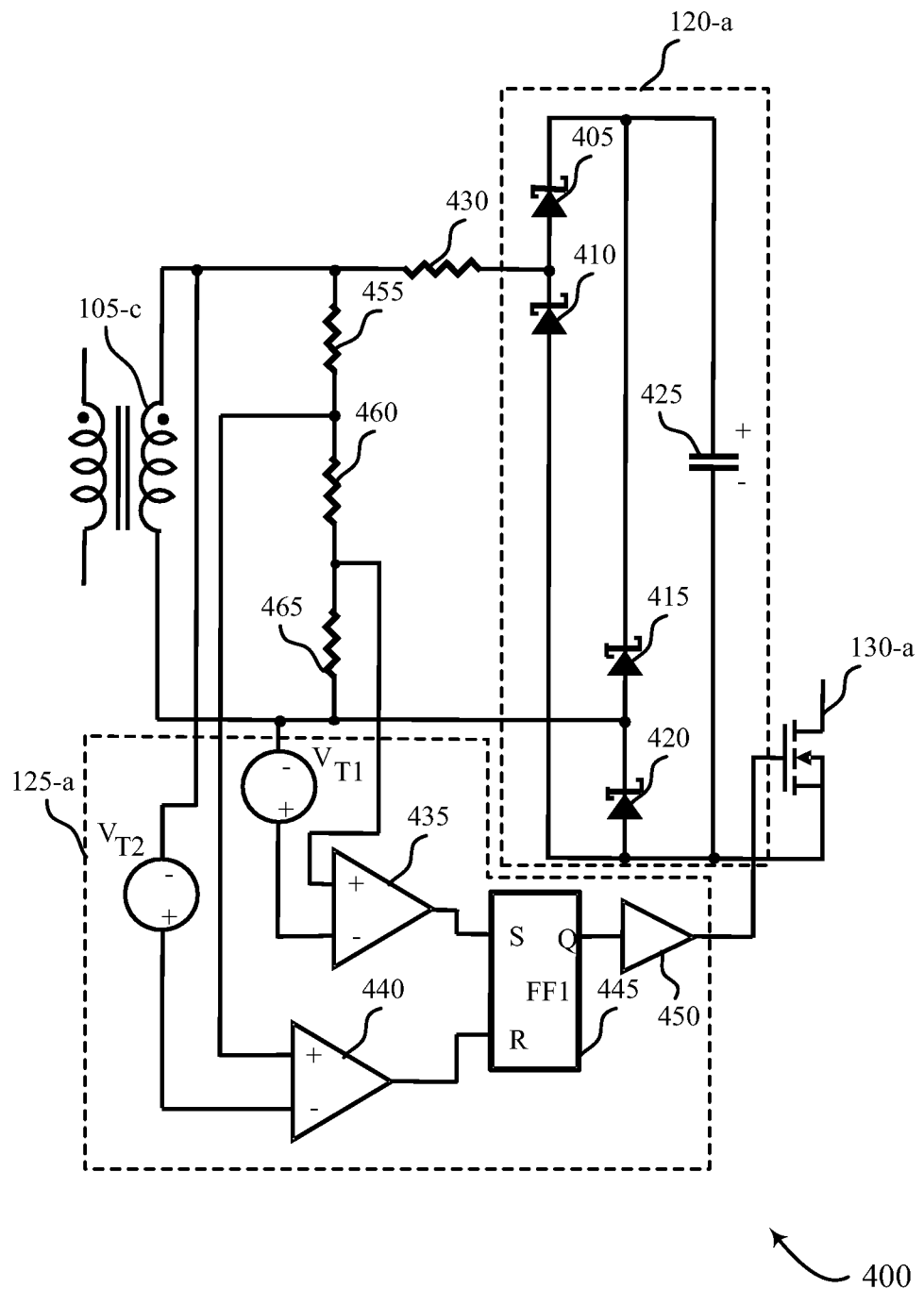
FIG. 4 illustrates a circuit diagram of a rectifier module and switching module for power and control signal transmission through an electrical isolation element.

With reference now to FIG. 4, a circuit 400 coupled with the secondary winding of inductor 105-c is described. The circuit 400 of FIG. 4 may correspond to rectifier module 120, switching module 125, and power switch 130 of FIG. 1, for example. The circuit 400 includes rectifier module 120-a, and switching module 125-a. In this embodiment, rectifier module 120-a is a traditional rectifier, including rectifier diodes 405, 410, 415, 420, and output capacitor 425. Rectifier module 120-a operates to rectify the cyclic signal at the secondary winding of inductor 105-c and provide some smoothing to the signal through output capacitor 425. Power switch 130-a is coupled with the rectifier module 120-a output and can switch the output to an attached load according to control signal information related to switching of the power switch 130-a. As described above, voltage pulses may be induced into the secondary winding of inductor 105-c. These voltage pulses have little or no impact on the output of the rectifier module 120-a because resistor 430 is selected so as to limit the pulse current and pulse charge generated from the voltage pulses.

The voltage pulses at the secondary winding are sensed by the switching module 125-a, which generates a control signal that is provided to a gate of power switch 130-a to control the turn-on and turn-off of the power switch 130-a. Switching module 125-a, in this example, includes a first comparator 435, a second comparator 440, a flip flop 445, and an output driver 450. Comparator 435 is configured to detect a voltage pulse on the secondary winding that indicates the power switch 130-a is to turn on. This turn on signal, in an embodiment, corresponds to a relatively low voltage pulse generated by the control timing signal module 115. The first comparator 435 is coupled with resistors 455, 460, and 465 to receive a divided voltage that is present on the secondary winding. The first comparator 435 compares this voltage to threshold voltage $V_{T1}$ offset version of the voltage present at the lower input of the secondary winding. In the event that the comparison indicates a voltage that is in excess of the threshold voltage, the first comparator 435 output signal is applied to the set input of the flip flop 445. The flip flop 445 output is applied to a gate driver 450. Gate driver 450 applies a signal to the gate of the power switch 130-*a* to turn the power switch 130-*a* on. In the event of a negative control signal transition, or turn off, voltage pulse, the increase in secondary winding voltage is detected at the second comparator 440, which is coupled with resistors 455, 460, and 465 to receive a divided voltage that is present on the secondary winding. This turn off signal, in an embodiment, corresponds to a relatively high voltage pulse generated by the control timing signal module 115. The second comparator 440 compares this voltage to threshold voltage $V_{T2}$ offset version of the voltage present at the upper input of the secondary winding. In the event that the comparison indicates a voltage that is in excess of the threshold voltage, the second comparator 440 output signal is applied to the reset input of the flip flop 445, that resets the flip flop 445. Resetting the flip flop 445 results in the power switch 130-*a* turning off. Accordingly, both power and control signals are provided through coupled inductor 105-*c*.

Figure 5:
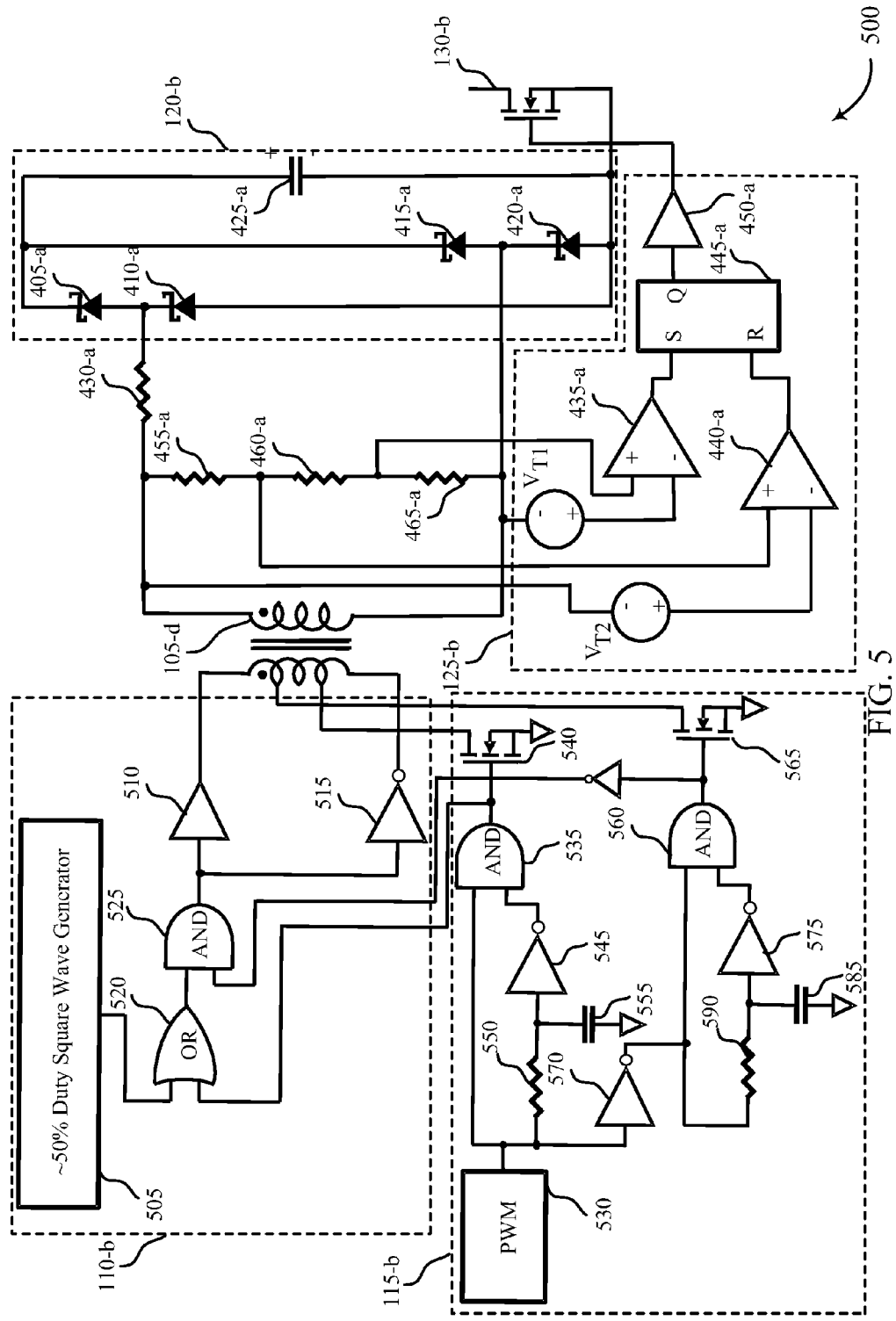
FIG. 5 illustrates a circuit diagram for power and control signal transmission through an electrical isolation element.

FIG. 5 illustrates a circuit including components for power and signal timing transmission of FIGS. 2 and 3 through a single inductor to rectifier and switching components of FIGS. 4 and 5, according to an embodiment. In this embodiment, circuit 500 is an isolated gate drive circuit having a single, relatively small, transformer, or coupled inductor, 105-*d* that provides both isolated drive power and isolated control timing signal transmission. Many components are similar to those described above, and the components coupled with the secondary side of inductor 105-*d* are as described in FIG. 4. The components coupled with the primary side of inductor 105-*d* are similar to those described in FIGS. 2 and 3, with the addition of several logic gates that couple current driver module 110-*b* with control timing signal module 115-*b*. Similarly as described above in FIG. 2, a current driver module 110-*b* is coupled with the primary side of the inductor, and includes an approximately 50% duty square wave generator 505. The output of the square wave generator 505 is provided to the inputs of a driver 510, and an inverting driver 515 through an OR gate 520 and an AND gate 525. When the output of one driver is high, the other is low, and drivers 510 and 515 operate to provide complementary square wave signals with slightly less than 50% duty cycle for driving the primary winding of inductor 105-*d*.

In this embodiment, the coupled inductor 105-*d* includes two taps that may be shorted to effectively reduce the number of turns on the primary winding of inductor 105-*d*. The shorting of the taps may be performed according to signals generated by control signal timing module 115-*b*. The control signal timing module 115-*b* includes similar components as described above with respect to FIG. 3, and includes a pulse width modulator (PWM) 530 that interacts with logic gates 535, 545, 560, 570, and 575, and related circuit resistors and capacitors 550, 555, 585, and 590 to control switches 540 and 565 in a manner as described above with respect to FIG. 3. In the embodiment of FIG. 5, the output of AND gate 535 is provided to the input of OR gate 520, and the inverted output of AND gate 560 is provided to an input of AND gate 525. Thus, when the output of AND gate 535 goes high, and a positive voltage pulse is triggered on the inductor 105-*d* regardless of the output state of square wave generator 505. Similarly, when the output of AND gate 560 is high, a negative voltage pulse is triggered on the inductor 105-*d* regardless of the output state of square wave generator 505.

In operation, circuit 500, in the absence of a control timing signal transition, operates drivers 510 and 515 to provide complementary square wave signals with slightly less than 50% duty cycle for driving the primary winding of inductor 105-*d*. The square wave signal induced into the secondary winding is rectified by diodes 405-*a*, 410-*a*, 415-*a*, and 420-*a* and applied to output capacitor 425-*a* and a gate drive load (not shown). In the event of a positive control signal transition driver 510 is forced high, driver 515 is forced low, and switch 540 is turned on for a short time interval defined by the RC time constant for resistor 550 and capacitor 555. The short time interval is a short pulse created at AND gate 535 and applied to one input of the OR gate 520 and to the gate of switch 540. Turning on switch 540 reduces the number of primary turns in inductor 105-*d*, thereby increasing the volts per turn and the secondary winding voltage, creating a short secondary winding voltage pulse whose amplitude exceeds the normal secondary winding voltage in the absence of the pulse. The short secondary winding voltage pulse does not affect the output voltage significantly because the resistor 430-*a* limits the pulse current and pulse charge. The short secondary winding voltage pulse is sensed by the comparator 435-*a*, as described above with respect to FIG. 4, which changes the flip flop 445-*a* output to driver 450-*a*. Driver 450-*a* applies a signal to the gate of the power switch 130-*b* to turn switch 130-*b* on.

In the event of a negative control signal transition, a short pulse is applied to the gate of switch 565, driver 510 output is forced low, and driver 515 output is forced high. As a result of the switch 565 being on, the effective number of primary winding turns is reduced, the volts per turn on the primary windings is increased, and the secondary winding voltage is increased. The increase in secondary winding voltage is detected at comparator 440-*a* and a pulse is generated that resets flip flop 445-*a*. Resetting the flip flop 445-*a* results in the power switch 130-*b* turning off. Thus, both drive energy and timing signal information using a single small transformer for isolated gate drive applications is provided.

Figure 6:
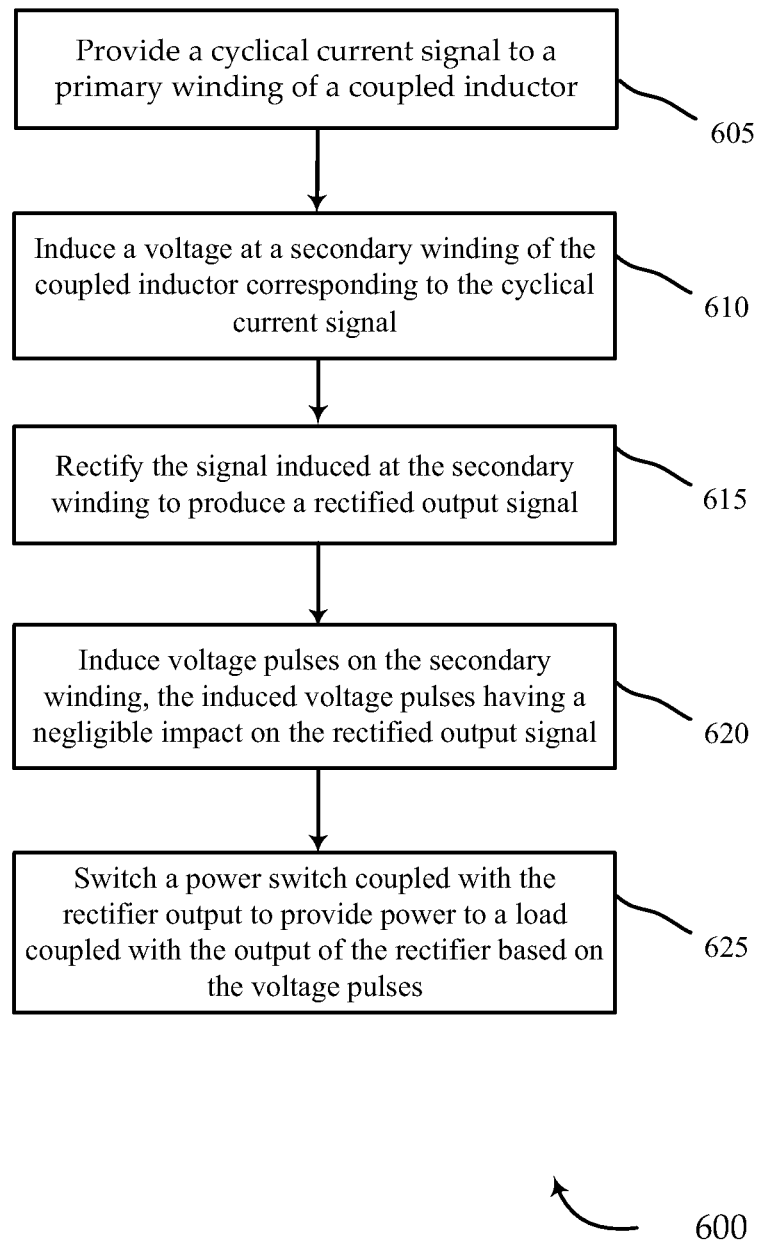
FIG. 6 is a flow chart diagram illustrating the operational steps for power and control signal transmission through an electrical isolation element according to various embodiments.

With reference now to FIG. 6, a flow chart 600 of a method for controlling and providing power to an output load is described. The steps of this method may be performed by one or more of the circuits described with respect to FIGS. 1-5. Initially, a cyclical current signal is provided to a primary winding of a coupled inductor, as indicated at block 605. A voltage is induced at a secondary winding of the coupled inductor corresponding to the cyclical current signal, as indicated at block 610. At block 615, the signal induced at the secondary winding is rectified to produce a rectified output signal. Voltage pulses are induced on the secondary winding, according to block 620, the induced voltage pulses having an insubstantial impact on the rectified output signal. That is, the induced voltage pulses, according to some embodiments, are of a relatively short duration and impart very little, if any, additional power or otherwise alter the rectified output signal. The voltage pulse may be induced by configuring a pulse width modulator to output a pulse width modulated control signal corresponding to the switching of the power switch and inducing voltage pulses on the secondary winding corresponding to the leading and trailing edges of the control signal. A power switch coupled with the rectifier output is switched to provide power to a load coupled with the output of the rectifier based on the voltage pulses, as noted at block 625. Thus, both power and control signals are provided through a single magnetic element, such as a coupled inductor.

Figure 7:
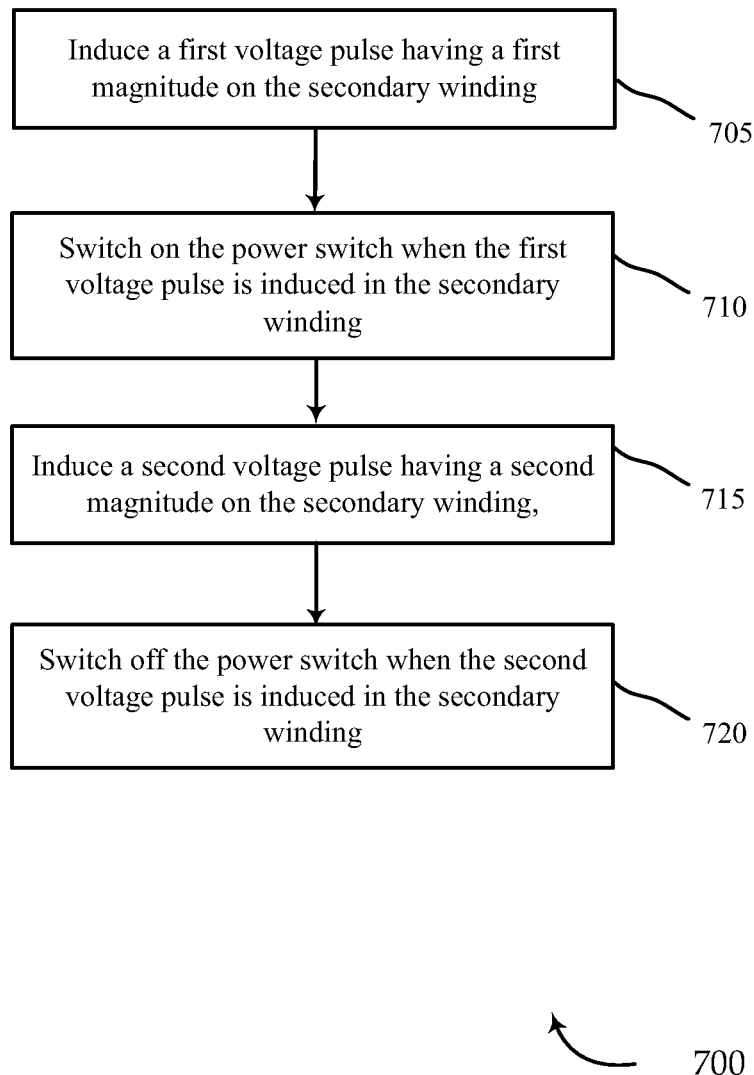
FIG. 7 is a flow chart diagram illustrating the operational steps for power and control signal transmission through an electrical isolation element according to various embodiments.

Referring now to FIG. 7, a flow chart diagram 700 of a method for inducing voltage pulses in a coupled inductor system is described. The steps of this method may be performed by one or more of the circuits described with respect to FIGS. 1-5. Initially, at block 705, a first voltage pulse having a first magnitude is induced on the secondary winding of the coupled inductor. The power switch is switched on when the first voltage pulse is induced in the secondary winding, as indicated at block 710. In some embodiments, switching on the power switch comprises comparing the voltage at the secondary winding and a first threshold voltage correlated to a voltage level of the first voltage pulse, and switching on the power switch based on the comparison. A second voltage pulse having a second magnitude is induced on the secondary winding, at block 715. The power switch is then switched off when the second voltage pulse is induced in the secondary winding, according to block 720. In some embodiments, switching off the power switch comprises comparing the voltage at the secondary winding to a second threshold voltage correlated to a voltage level of the second voltage pulse, and switching off the power switch when the voltage at the secondary winding exceeds the second threshold voltage.

Figure 8:
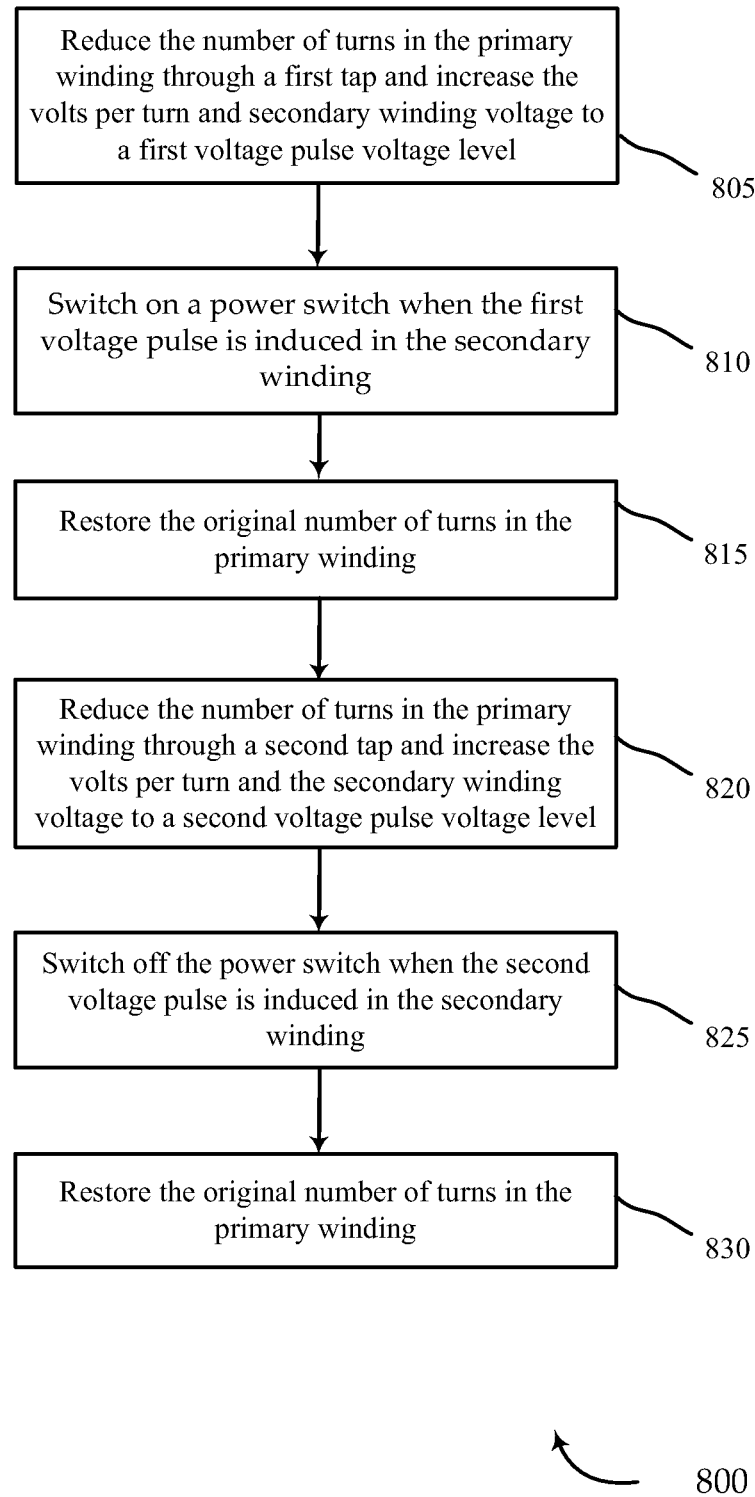
FIG. 8 is a flow chart diagram illustrating the operational steps for power and control signal transmission through an electrical isolation element according to various embodiments.

Referring now to FIG. 8, a flow chart diagram 800 of a method for inducing voltage pulses through a tapped coupled inductor is described. The steps of this method may be performed by one or more of the circuits described with respect to FIGS. 1-5. Initially, at block 805, the number of turns in a primary winding of a coupled inductor are reduced through a first tap, thereby increasing the volts per turn and increasing the secondary winding voltage to a first voltage pulse voltage level. A power switch coupled with the secondary winding is switched on when the first voltage pulse is induced in the secondary winding, as indicated at block 810. The original number of turns in the primary winding is restored, as noted at block 815. At block 820, the number of turns in the primary winding are reduced through a second tap, thereby increasing the volts per turn and increasing the secondary winding voltage to a second voltage pulse voltage level. The power switch is switched off when this second voltage pulse is induced in the secondary winding, as noted at block 825. The original number of turns in the primary winding is restored, at block 830. Thus, both power and control signals are provided through a single magnetic element, such as a tapped coupled inductor.

While the above description contains many specificities, these should not be construed as limitations on the scope of the invention, but rather, as exemplifications or embodiments thereof. Many other variations are possible. For example, there are a wide variety of circuits that can benefit from the general approach to power and control signal transmission across an electrical isolation element. Circuits similar to the circuits shown but with polarity of the input or output reversed from that illustrated in the figures shall be considered embodiments of the subject invention. Circuits similar to those shown, but having coupled magnetic circuit elements with more than two windings and circuits with more than one output shall be considered embodiments of the subject invention. In many of the circuits shown there are series connected networks. The order of placement of circuit elements in series connected networks is inconsequential in the illustrations shown so that series networks in the illustrated circuits with circuit elements reversed or placed in an entirely different order within series connected networks are equivalent to the circuits illustrated and shall be considered embodiments of the subject invention. Also, some of the embodiments illustrated shows N channel MOSFET switches, but the operation revealed and the benefits achieved can also be realized in circuits that implement the switches using P channel MOSFETs, IGBTs, JFETs, bipolar transistors, junction rectifiers, or schottky rectifiers, which should be considered embodiments of the disclosure.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments, Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A gate driver apparatus, comprising,
   a current driver module configured to generate a cyclical current signal;
   a coupled inductor having a primary winding and a secondary winding, the primary winding coupled with the current driver module and configured to induce a voltage at the secondary winding corresponding to the cyclical current signal;
   a rectifier module coupled with the secondary winding configured to rectify the signal induced at the secondary winding;
   a control timing signal module coupled with the primary winding and configured to induce voltage pulses on the secondary winding, the induced voltage pulses having an insubstantial impact on the output of the rectifier module; and a switching module coupled with the secondary winding and configured to receive the voltage pulses and control a power switch coupled with the output of the rectifier responsive to the voltage pulses.

2. The apparatus of claim 1, wherein the control timing signal module is configured to induce voltage pulses on the secondary winding comprising a first voltage pulse having a first magnitude, and a second voltage pulse having a second magnitude, and wherein the switching module is configured to receive the first voltage pulse and switch on the power switch, and receive the second voltage pulse and switch off the power switch.

3. The apparatus of claim 2, wherein the switching module comprises:

a first comparator coupled with the secondary winding and configured to compare the voltage at the secondary winding to a first threshold voltage and switch on the power switch when the voltage at the secondary winding exceeds the first threshold voltage, the first threshold voltage correlated to a voltage level of the first voltage pulse; and a second comparator coupled with the secondary winding and configured to compare the voltage at the secondary winding to a second threshold voltage and switch off the power switch when the voltage at the secondary winding exceeds the second threshold voltage, the second threshold voltage correlated to a voltage level of the second voltage pulse.

4. The apparatus of claim 3, wherein the switching module further comprises a set-reset (SR) flip flop, the set input of the SR flip flop coupled with the first comparator, the reset input of the SR flip flop coupled with the second comparator, and the output of the SR flip flop coupled with the power switch.

5. The apparatus of claim 1, wherein the primary winding comprises at least one tap, and the control timing signal module is coupled with the tap and configured to, for the duration of a voltage pulse, reduce the number of turns in the primary winding through the tap, thereby increasing the volts per turn and increasing the secondary winding voltage.

6. The apparatus of claim 1, wherein the primary winding comprises a first tap and a second tap, each of the first and second taps configured to reduce the number of turns in the primary winding and thereby increase the volts per turn and increase the secondary winding voltage, and wherein the control timing signal module is coupled with the first and second taps and configured to:
couple to the first tap to induce a first voltage pulse on the secondary winding for a first duration and turn on the power switch; and
couple to the second tap to induce a second voltage pulse on the secondary winding for a second duration and turn off the power switch.

7. The apparatus of claim 1, wherein the control timing signal module comprises a pulse width modulator configured to provide control signals to a plurality of logic gates to generate relatively short duration voltage pulses on the secondary winding corresponding to the leading and trailing edges of the control signals provided by the pulse width modulator.

8. The apparatus of claim 1, wherein the power switch is a MOSFET.

9. A method for controlling and providing power to an output load, comprising:

providing a cyclical current signal to a primary winding of a coupled inductor;

inducing a voltage at a secondary winding of the coupled inductor corresponding to the cyclical current signal;

rectifying the signal induced at the secondary winding to produce a rectified output signal;

inducing voltage pulses on the secondary winding, the induced voltage pulses having an insubstantial impact on the rectified output signal; and switching a power switch coupled with the rectifier output to provide power to a load coupled with the output of the rectifier based on the voltage pulses.

10. The method of claim 9, wherein inducing voltage pulses comprises:

inducing a first voltage pulse having a first magnitude on the secondary winding;

switching on the power switch when the first voltage pulse is induced in the secondary winding;

inducing a second voltage pulse having a second magnitude on the secondary winding, and switching off the power switch when the second voltage pulse is induced in the secondary winding.

11. The method of claim 10, wherein switching on the power switch comprises:

comparing, at a first comparator coupled with the secondary winding, the voltage at the secondary winding and a first threshold voltage; and switching on the power switch when the voltage at the secondary winding exceeds the first threshold voltage, the first threshold voltage correlated to a voltage level of the first voltage pulse.

12. The method of claim 10, wherein switching off the power switch comprises:

comparing, at a second comparator coupled with the secondary winding, the voltage at the secondary winding to a second threshold voltage; and switching off the power switch when the voltage at the secondary winding exceeds the second threshold voltage, the second threshold voltage correlated to a voltage level of the second voltage pulse.

13. The method of claim 9, wherein inducing voltage pulses comprises:

reducing the number of turns in the primary winding through a tap, thereby increasing the volts per turn and increasing the secondary winding voltage; and restoring the original number of turns in the primary winding.

14. The method of claim 9, wherein inducing voltage pulses comprises:

reducing the number of turns in the primary winding through a first tap, thereby increasing the volts per turn and increasing the secondary winding voltage to a first voltage pulse voltage level;

switching on the power switch when the first voltage pulse is induced in the secondary winding restoring the original number of turns in the primary winding;

reducing the number of turns in the primary winding through a second tap, thereby increasing the volts per turn and increasing the secondary winding voltage to a second voltage pulse voltage level;

switching off the power switch when the second voltage pulse is induced in the secondary winding; and restoring the original number of turns in the primary winding.

15. The method of claim 9, wherein inducing voltage pulses comprises:

configuring a pulse width modulator to output a pulse width modulated control signal corresponding to the switching of the power switch; and inducing voltage pulses on the secondary winding corresponding to the leading and trailing edges of the control signal.

16. An apparatus for controlling and providing power to an output load, comprising:
- means for providing a cyclical current signal to a primary winding of a coupled inductor;
- means for inducing a voltage at a secondary winding of the coupled inductor corresponding to the cyclical current signal;
- means for rectifying the signal induced at the secondary winding to produce a rectified output signal;
- means for inducing voltage pulses on the secondary winding, the induced voltage pulses having an insubstantial impact on the rectified output signal; and
- means for switching a power switch coupled with the rectifier output to provide power to a load coupled with the output of the rectifier based on the voltage pulses.

17. The apparatus of claim 16, wherein the means for inducing voltage pulses comprises:
- means for inducing a first voltage pulse having a first magnitude on the secondary winding;
- means for switching on the power switch when the first voltage pulse is induced in the secondary winding;
- means for inducing a second voltage pulse having a second magnitude on the secondary winding, and
- means for switching off the power switch when the second voltage pulse is induced in the secondary winding.

18. The apparatus of claim 17, wherein the means for switching on the power switch comprises:
- means for comparing, at a first comparator coupled with the secondary winding, the voltage at the secondary winding and a first threshold voltage; and
- means for switching on the power switch when the voltage at the secondary winding exceeds the first threshold voltage, the first threshold voltage correlated to a voltage level of the first voltage pulse.

19. The apparatus of claim 18, wherein the means for switching on the power switch comprises:
- means for comparing, at a second comparator coupled with the secondary winding, the voltage at the secondary winding to a second threshold voltage; and
- means for switching off the power switch when the voltage at the secondary winding exceeds the second threshold voltage, the second threshold voltage correlated to a voltage level of the second voltage pulse.

20. The apparatus of claim 16, wherein the means for inducing voltage pulses comprises:
- means for reducing the number of turns in the primary winding through a tap, thereby increasing the volts per turn and increasing the secondary winding voltage; and
- means for restoring the original number of turns in the primary winding.

* * * * *